United States Patent
Kim

(10) Patent No.: US 12,499,112 B2
(45) Date of Patent: Dec. 16, 2025

(54) METHODS, SYSTEMS, AND MEDIA FOR INTERPRETING VOICE QUERIES

(71) Applicant: GOOGLE LLC, Mountain View, CA (US)

(72) Inventor: Yongsung Kim, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/675,784

(22) Filed: May 28, 2024

(65) Prior Publication Data

US 2024/0311374 A1  Sep. 19, 2024

Related U.S. Application Data

(63) Continuation of application No. 17/560,693, filed on Dec. 23, 2021, now Pat. No. 12,001,429, which is a
(Continued)

(51) Int. Cl.
*G06F 17/30* (2006.01)
*G06F 16/22* (2019.01)
(Continued)

(52) U.S. Cl.
CPC ...... *G06F 16/2454* (2019.01); *G06F 16/2282* (2019.01); *G06F 16/23* (2019.01);
(Continued)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 7,523,099 B1   4/2009 Egnor et al.
7,526,425 B2   4/2009 Marchisio et al.
(Continued)

OTHER PUBLICATIONS

U.S. Appl. No. 17/560,693, filed Dec. 23, 2021, Allowed.
(Continued)

*Primary Examiner* — Hung D Le
(74) *Attorney, Agent, or Firm* — Brake Hughes Bellermann LLP

(57) ABSTRACT

Methods, systems, and media for interpreting queries are described herein. For example, an illustrative method may include: determining, based on a voice query received in a search domain, a first voice recognition term and a second voice recognition term; determining that at least a portion of the first voice recognition term corresponds to an entity name associated with the search domain; determining, based on the entity name, a feasibility score for the first voice recognition term; ranking, based on the feasibility score, the first voice recognition term over the second voice recognition term; and executing the voice query in the search domain using the first voice recognition term, the first voice recognition term being selected for use over the second voice recognition term based on the ranking. Corresponding systems, devices, and other implementations are also described.

20 Claims, 11 Drawing Sheets

Related U.S. Application Data continuation of application No. 15/587,915, filed on May 5, 2017, now Pat. No. 11,210,289, which is a continuation of application No. 14/816,802, filed on Aug. 3, 2015, now Pat. No. 9,646,050, which is a continuation of application No. 13/677,020, filed on Nov. 14, 2012, now Pat. No. 9,116,918.

(51) Int. Cl.

| | | |
|---|---|---|
| *G06F 16/23* | (2019.01) | |
| *G06F 16/2453* | (2019.01) | |
| *G06F 16/2457* | (2019.01) | |
| *G06F 16/29* | (2019.01) | |
| *G06F 16/332* | (2019.01) | |
| *G06F 16/9535* | (2019.01) | |
| *G06F 16/9538* | (2019.01) | |
| *H04N 21/278* | (2011.01) | |
| *H04N 21/472* | (2011.01) | |

(52) U.S. Cl.
CPC .... *G06F 16/2365* (2019.01); *G06F 16/24549* (2019.01); *G06F 16/24575* (2019.01); *G06F 16/29* (2019.01); *G06F 16/3322* (2019.01); *G06F 16/9535* (2019.01); *G06F 16/9538* (2019.01); *H04N 21/278* (2013.01); *H04N 21/47202* (2013.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | |
|---|---|---|---|
| 7,636,714 | B1 | 12/2009 | Lamping et al. |
| 7,792,837 | B1 | 9/2010 | Zhao |
| 7,831,632 | B2 | 11/2010 | Djugash et al. |
| 8,027,988 | B1 | 9/2011 | Egnor et al. |
| 8,112,432 | B2 | 2/2012 | Zhou et al. |
| 8,117,206 | B2 | 2/2012 | Sibley et al. |
| 8,214,210 | B1* | 7/2012 | Woods .................... G10L 15/08 704/7 |
| 8,356,029 | B2 | 1/2013 | Djugash et al. |
| 8,364,692 | B1 | 1/2013 | Allen et al. |
| 8,463,774 | B1* | 6/2013 | Buron .................... G06F 16/95 707/724 |
| 8,527,520 | B2 | 9/2013 | Morton et al. |
| 8,533,223 | B2 | 9/2013 | Houghton |
| 8,595,250 | B1 | 11/2013 | Egnor et al. |
| 8,752,001 | B2* | 6/2014 | Sureka .................... G06N 5/01 717/102 |
| 9,639,874 | B2* | 5/2017 | Psota .................. G06Q 10/083 |
| 12,400,656 | B2* | 8/2025 | Chao ..................... G10L 15/22 |
| 2004/0243407 | A1 | 12/2004 | Yu et al. |
| 2005/0222976 | A1 | 10/2005 | Pfleger |
| 2005/0222977 | A1 | 10/2005 | Zhou et al. |
| 2007/0198511 | A1 | 8/2007 | Kim et al. |
| 2008/0005090 | A1 | 1/2008 | Khan et al. |
| 2009/0125534 | A1 | 5/2009 | Morton et al. |
| 2009/0204596 | A1 | 8/2009 | Brun et al. |
| 2009/0244592 | A1 | 10/2009 | Grams |
| 2009/0307208 | A1* | 12/2009 | Peng .................... G06F 16/334 707/999.005 |
| 2009/0326923 | A1 | 12/2009 | Yan et al. |
| 2010/0114944 | A1* | 5/2010 | Adler .................... G10L 13/027 707/E17.062 |
| 2010/0223292 | A1 | 9/2010 | Bhagwan et al. |
| 2010/0293195 | A1 | 11/2010 | Houghton |
| 2010/0312782 | A1* | 12/2010 | Li ........................ G06F 16/9038 707/753 |
| 2011/0004618 | A1 | 1/2011 | Chaudhary |
| 2011/0119243 | A1 | 5/2011 | Diamond et al. |
| 2011/0231347 | A1 | 9/2011 | Xu et al. |
| 2011/0307432 | A1 | 12/2011 | Yao et al. |
| 2011/0320458 | A1 | 12/2011 | Karana |
| 2012/0059838 | A1 | 3/2012 | Berntson et al. |
| 2012/0109966 | A1 | 5/2012 | Liang et al. |
| 2012/0232897 | A1* | 9/2012 | Pettyjohn ................ G10L 15/22 704/235 |
| 2013/0144854 | A1* | 6/2013 | Pantel ................. G06F 16/9535 707/706 |
| 2013/0173639 | A1* | 7/2013 | Chandra ............... G06F 16/951 707/754 |
| 2013/0238594 | A1* | 9/2013 | Hong .................... G06F 16/951 707/710 |
| 2013/0238631 | A1* | 9/2013 | Carmel ................. G06F 16/288 707/742 |
| 2013/0262107 | A1* | 10/2013 | Bernard .................. G06F 16/40 704/235 |
| 2013/0308840 | A1* | 11/2013 | Tallapragada ....... G06F 16/5846 382/128 |
| 2013/0339340 | A1* | 12/2013 | Pfitzner .................... G06F 16/95 707/E17.017 |
| 2014/0006393 | A1* | 1/2014 | Soshin .................... G06F 16/00 707/E17.014 |
| 2014/0129220 | A1* | 5/2014 | Zhang .................... G10L 15/18 704/235 |
| 2014/0136197 | A1* | 5/2014 | Mamou .................. G10L 15/26 704/235 |
| 2014/0288932 | A1* | 9/2014 | Yeracaris ................ G10L 17/10 704/249 |
| 2022/0148591 | A1* | 5/2022 | Chao ..................... G10L 15/22 |
| 2024/0362282 | A1* | 10/2024 | Malhotra ............ G06F 16/9535 |

OTHER PUBLICATIONS

U.S. Appl. No. 15/587,915, filed May 5, 2017, Issued.
U.S. Appl. No. 14/816,802, filed Aug. 3, 2015, Issued.
U.S. Appl. No. 13/677,020, filed Nov. 14, 2012, Issued.
Guo , et al., "Names Entity Recognition in Query", Proc. 32nd Int'l ACM SIGIR Conference on Research and Development in Information Retrieval, SIGIR '09, Jan. 2009, pp. 267-274.

* cited by examiner

ENTITY TABLE

| Entity Name | Entity Type | Entity Score |
|---|---|---|
| House | Movie Title | 0.345 |
| House | TV Show Title | 9.750 |
| House | TV Character Name | 2.036 |
| House | Actor Name | 0.230 |
| ... | ... | ... |
| Entity Name U | Series Title | 5.750 |
| Entity Name U | Series Title | 6.890 |
| Entity Name V | Application | 10.000 |
| Entity Name W | Corpus Type | 5.000 |
| Entity Name X | Website | 1.000 |
| Entity Name Y | Genre | 1.036 |
| Entity Name Z | Release Date | 1.000 |

FIG. 3

ENTITY RESULTS

| Entity Name | Entity Type | Entity Score |
|---|---|---|
| action | SERIES | 5.750 |
| action | GENRE | 1.036 |
| action | MOVIE | 0.345 |
| movies | APP | 10.000 |
| movies | CORPUS_TYPE_MOVIE | 5.000 |
| movies | CHANNEL | 1.000 |
| movies | SERIES | 0.000 |
| tom cruise | ACTOR | 5.750 |
| tom | WEB_SITE | 1.036 |
| tom | SERIES | 0.345 |
| tom | MOVIE | 10.000 |
| the cruise | MOVIE | 5.000 |
| the cruise | SERIES | 1.000 |

FIG. 5

INTERPRETED ENTITY RESULTS

| Entity Name | Entity Type | Entity Score |
|---|---|---|
| action | GENRE | 1.036 |
| movies | CORPUS_TYPE_MOVIE | 5.000 |
| tom cruise | ACTOR | 5.081 |

FIG. 6

METHODS, SYSTEMS, AND MEDIA FOR INTERPRETING VOICE QUERIES

CROSS-REFERENCE TO RELATED APPLICATION

This application is a continuation of U.S. application Ser. No. 17/560,693, filed Dec. 23, 2021, which is a continuation of U.S. application Ser. No. 15/587,915, filed May 5, 2017, which is a continuation of U.S. application Ser. No. 14/816,802, filed Aug. 3, 2015, which is a continuation of U.S. application Ser. No. 13/677,020, filed Nov. 14, 2012, each of which is hereby incorporated by reference herein in their entireties.

TECHNICAL FIELD

Methods, systems, and media for interpreting queries are provided. More particularly, the disclosed subject matter relates to interpreting queries based on entity information.

BACKGROUND

There is an overwhelming volume of content that is available to the average consumer. For example, with respect to media content, there are many applications that a consumer can use on a television or set-top box that allow the consumer to consume media content from various sources (e.g., media content that is delivered linearly from a multichannel video programming distributor, video-on-demand content that is provided by a multichannel video programming distributor, personal media content that is acquired by the consumer, recorded content that is stored on a digital video recorder or any other suitable storage device, and/or on-demand content that is provided from over-the-top providers).

As the number of sources and the volume of content continue to increase, consumers are increasingly reliant on search engines, where a consumer can formulate a search query that includes search constraints that identify what information is being sought. Search engines have been developed that receive such search queries and return search results responsive to the search query. Some search engines, however, provide a broad set of search results without having an understanding of the search query. For example, in response to providing the search query "action movie with tom cruise," these search engines can provide irrelevant search results like "Last Action Hero" and "Tom and Jerry" simply because a portion of the search query is included in the title of the pieces of content.

Accordingly, gaining an understanding of the search query can produce more meaningful search results.

SUMMARY

In accordance with various implementations of the disclosed subject matter, mechanisms for interpreting voice queries are provided.

In accordance with some implementations of the disclosed subject matter, a method for interpreting voice queries is provided. The method comprises: determining, based on a voice query received in a search domain, a first voice recognition term and a second voice recognition term; determining that at least a portion of the first voice recognition term corresponds to an entity name associated with the search domain; determining, based on the entity name, a feasibility score for the first voice recognition term; ranking, based on the feasibility score, the first voice recognition term relative to the second voice recognition term; and executing the voice query in the search domain using the first voice recognition term, the first voice recognition term being selected for use over the second voice recognition term based on the ranking.

In accordance with some implementations of the disclosed subject matter, a system for interpreting voice queries is provided. The system comprises: a memory storing instructions; and a processor communicatively coupled to the memory and configured to execute the instructions to perform a process. The process performed by the processor may include: determining, based on a voice query received in a search domain, a first voice recognition term and a second voice recognition term; determining that at least a portion of the first voice recognition term corresponds to an entity name associated with the search domain; determining, based on the entity name, a feasibility score for the first voice recognition term; ranking, based on the feasibility score, the first voice recognition term relative to the second voice recognition term; and executing the voice query in the search domain using the first voice recognition term, the first voice recognition term being selected for use over the second voice recognition term based on the ranking.

In accordance with some implementations of the disclosed subject matter, a non-transitory computer-readable medium contains computer-executable instructions that, when executed by a processor, cause the processor to perform a process for interpreting voice queries. The process includes: determining, based on a voice query received in a search domain, a first voice recognition term and a second voice recognition term; determining that at least a portion of the first voice recognition term corresponds to an entity name associated with the search domain; determining, based on the entity name, a feasibility score for the first voice recognition term; ranking, based on the feasibility score, the first voice recognition term relative to the second voice recognition term; and executing the voice query in the search domain using the first voice recognition term, the first voice recognition term being selected for use over the second voice recognition term based on the ranking.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify like elements.

FIG. 3 is an illustrative example of an entity table that includes entity names extracted from metadata associated with a search domain and their associated entity types and entity scores in accordance with some implementations of the disclosed subject matter.

FIG. 5 is an illustrative example of entity results obtained from the entity table of FIG. 3 in response to search terms extracted from a search query in accordance with some implementations of the disclosed subject matter.

FIG. 6 is an illustrative example of interpreted entity results based on entity scores and contextual information in accordance with some implementations of the disclosed subject matter.

DETAILED DESCRIPTION

Figure 1:
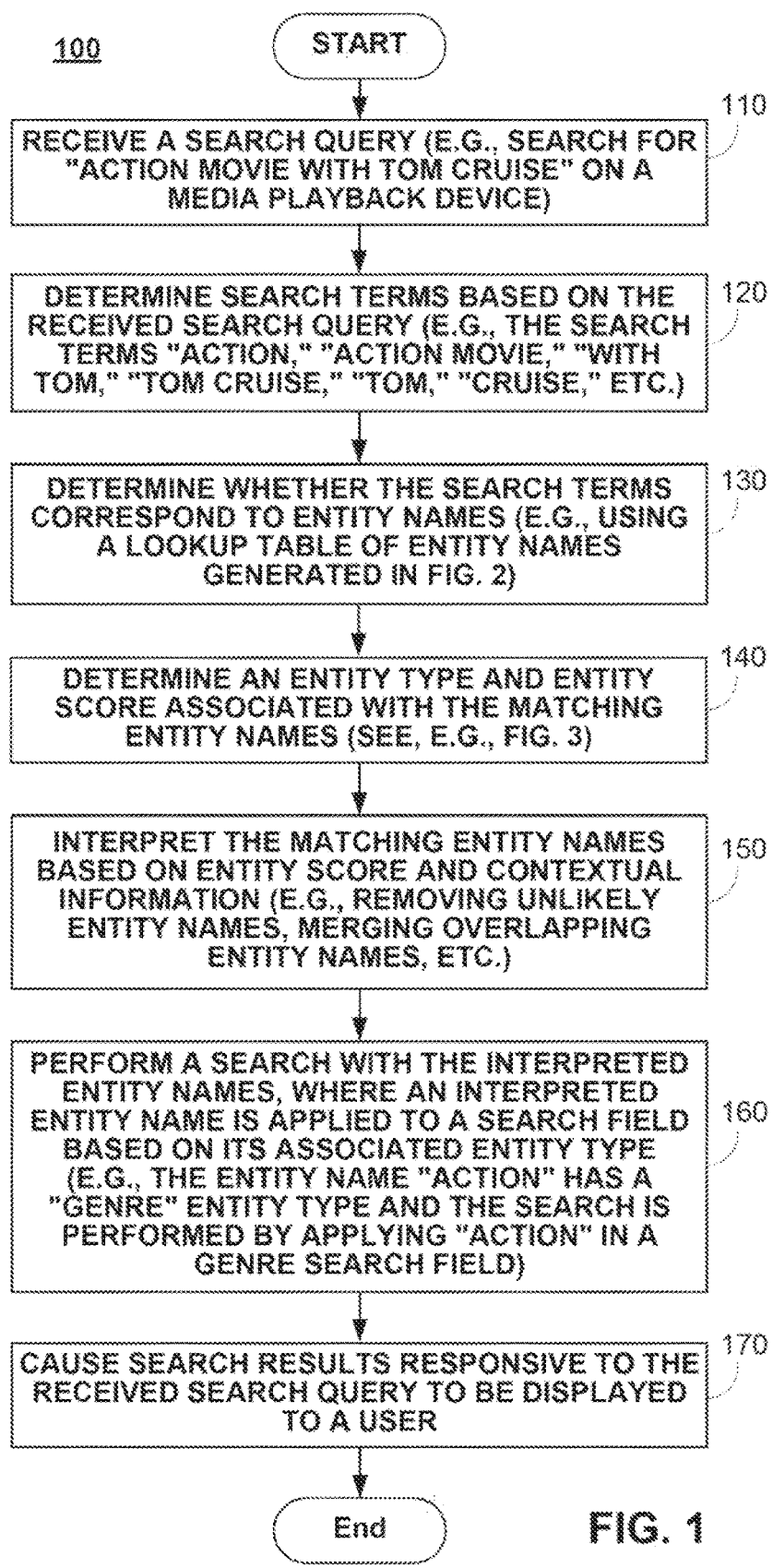
FIG. 1 is a flowchart of an illustrative process for interpreting a search query based on entity information and providing search results responsive to the search query in accordance with some implementations of the disclosed subject matter.

Methods, systems, and media for interpreting queries are provided.

In accordance with some implementations of the disclosed subject matter, mechanisms for interpreting queries, such as search queries and voice queries, are provided. In response to receiving a query in a search domain, the query can be interpreted by determining search terms based on the received query and searching for entity information that corresponds to the search terms. For example, in response to receiving the query "action movie with tom cruise," the query can be segmented to obtain initial search terms that include "action movie with tom cruise," "action movie with tom," "movie with tom cruise," "action movie," "movie with tom," "with tom cruise," "movie with," "with tom," "tom cruise," "action," "movie," "with," "tom," "cruise," etc. Using entity information, it can be determined whether one or more of these search terms corresponds to entity information. For example, it can be determined that the terms "action," "movie," "tom cruise," "tom," and "the cruise" correspond to entity names located in a table of entity information.

In some implementations, entity information can be identified from metadata that is associated with a search domain. In a more particular implementation, a table that includes entity information can be created by retrieving metadata from one or more suitable sources and identifying entities from the retrieved metadata. In a media search domain, metadata associated with television programs and movies can be retrieved and the identified entities can include television program titles, movie titles, actor names, character names, director names, genres or category information, etc. Each of these entities can have an associated entity type and an associated entity score.

It should be noted that, in some implementations, the associated entity score can be based on the popularity of the entity within the particular search domain. This can, for example, allow the mechanisms to resolve conflicts between entities having the same or similar entity names. For example, if a television program having the title "house" is determined to be more popular than a movie having the title "house," the television program can receive a higher entity score than the movie. In another example, in some cases, the search term "house" having the entity type corresponding to a movie title and having a lower entity score can be removed from the set of initial search terms (e.g., a higher entity score can be used to indicate a more relevant or more frequently searched result).

It should also be noted that, in some implementations, the associated entity score can be an aggregate entity score. For example, an entity score associated with the actor "tom cruise" can be the average of the entity scores calculated for each television program, movie, and/or other suitable media content associated with "tom cruise." In another example, an entity score associated with a channel identifier "AAA" can be the average of the entity scores for each television program provided by that channel.

Upon determining which search terms correspond with entities, some of the search terms (e.g., unlikely search terms) can be removed based on entity scores associated with the entities and/or contextual information derived from the search query. For example, the entity "house" having the entity type MOVIE may be removed from the search terms when the higher scoring entity "house" having the entity type SERIES is also present. In another example, overlapping entities can be removed from the search terms, such as the search term "tom" when the search term "tom cruise" includes the term "tom." In yet another example, a search term can be removed based on context within the received search query. In a more particular example, the term "2012" from the search query "action movie 2012" is unlikely to be a movie title having the entity type MOVIE because of its positioning within the search query and because of the other terms within the search query. Based on context within the search query, the term "2012" has a greater likelihood of having an entity type of RELEASE DATE or AIRING DATE. If the search query included the term "2012" alone, the contextual information can indicate that the term "2012" may have a greater likelihood of being a movie title and having the entity type MOVIE.

Upon removing unlikely search terms, the remaining search terms can be used to perform a search in the search domain. Referring back to the above-mentioned search query of "action movie with tom cruise," if the remaining search terms are "action" having the entity type GENRE, "movie" as a result type (e.g., entity type CORPUS_TYPE_MOVIE), and "tom cruise" having the entity type ACTOR_NAME, a search in the media search domain can be performed by providing "action" in a genre search field, "tom cruise" in an actor name search field, and "movie" in a result type field. The search results responsive to these remaining search terms can then, for example, be provided to a user of the media playback device.

In some implementations, the query interpretation mechanisms can be also be used to interpret voice queries or voice commands. In response to receiving a voice query, the mechanisms can use entity information to select from voice recognition results based on entity scores and feasibility scores. For example, in response to receiving a voice query, the voice query can be interpreted by determining voice recognition results and searching for entity information that corresponds to the voice recognition results. A feasibility score based on entity scores can be calculated for each of the voice recognition results and the voice recognition results can be ranked based on the calculated feasibility score. A feasible voice recognition result from the set of voice recognition results can then be selected from the voice recognition results. In response to selecting a feasible voice recognition result, the mechanisms can cause a suitable command in a media playback device to be performed. For example, in response receiving a voice query of "watch CNN," the mechanisms can interpret the voice query and cause the media playback device to tune to the channel associated with the CNN channel identifier (e.g., as opposed to launching the website www.cnn.com).

Although the implementations described herein generally relate to interpreting queries for media content, such as television programs, movies, and video clips, this is merely illustrative. For example, these query interpretation mechanisms can be implemented in a product search domain, where the entity information is identified from structured product metadata (e.g., product name, manufacturer name, price, product category, product rating, merchant name, etc.). In another example, these query interpretation mechanisms can be implemented in a music search domain, where the entity information is identified from structured music metadata (e.g., song title, artist name, album title, release year, music genre, audio format, etc.). In yet another example, these query interpretation mechanisms can be implemented in a books and literature search domain, where the entity information is identified from structured book data (e.g., book title, author name, publisher name, publication date, number of pages, book genre, book format, etc.). Accordingly, the query interpretation mechanisms can be used in any suitable search domain for providing relevant search results in the search domain.

Turning to FIG. 1, FIG. 1 is a flow chart of an illustrative process 100 for providing a query interpretation application, where a search query is interpreted based on entity information, in accordance with some implementations of the disclosed subject matter.

Process 100 can begin by receiving a search query at 110. For example, using a media playback device (e.g., a television device, a set-top box, a tablet computing device), a search interface can be presented to a user of the media playback device for inputting search queries. An example of a search query can be "action movie with tom cruise." As described in connection with FIG. 8, the query interpretation application can also receive other suitable queries, such as voice queries that are captured by a media playback device having audio input capabilities. The received search query can be transmitted to the query interpretation application for processing.

At 120, the query interpretation application can determine one or more search terms based on the received search query. For example, in response to receiving the search query "action movie with tom cruise," the query interpretation application can segment the received search query to obtain search terms, such as "action movie with tom cruise," "action movie with tom," "movie with tom cruise," "action movie with," "movie with tom," "with tom cruise," "action movie," "movie with," "with tom," "tom cruise," "action," "movie," "with," "tom," and "cruise."

At 130, the query interpretation application can determine whether one or more of the search terms correspond to entity information. For example, the query interpretation application can access an entity table that includes entity names derived from media content-related metadata and determine whether one or more of the search terms is associated with an entity name in the entity table. In a more particular example, the query interpretation application can perform a table lookup operation in the entity table to determine which search terms are associated with entity names in the entity table. In another more particular example, the query interpretation application can transmit a query to a data source including the entity table, where the query requests an indication of which search terms match entity names in the entity table.

Figure 2:
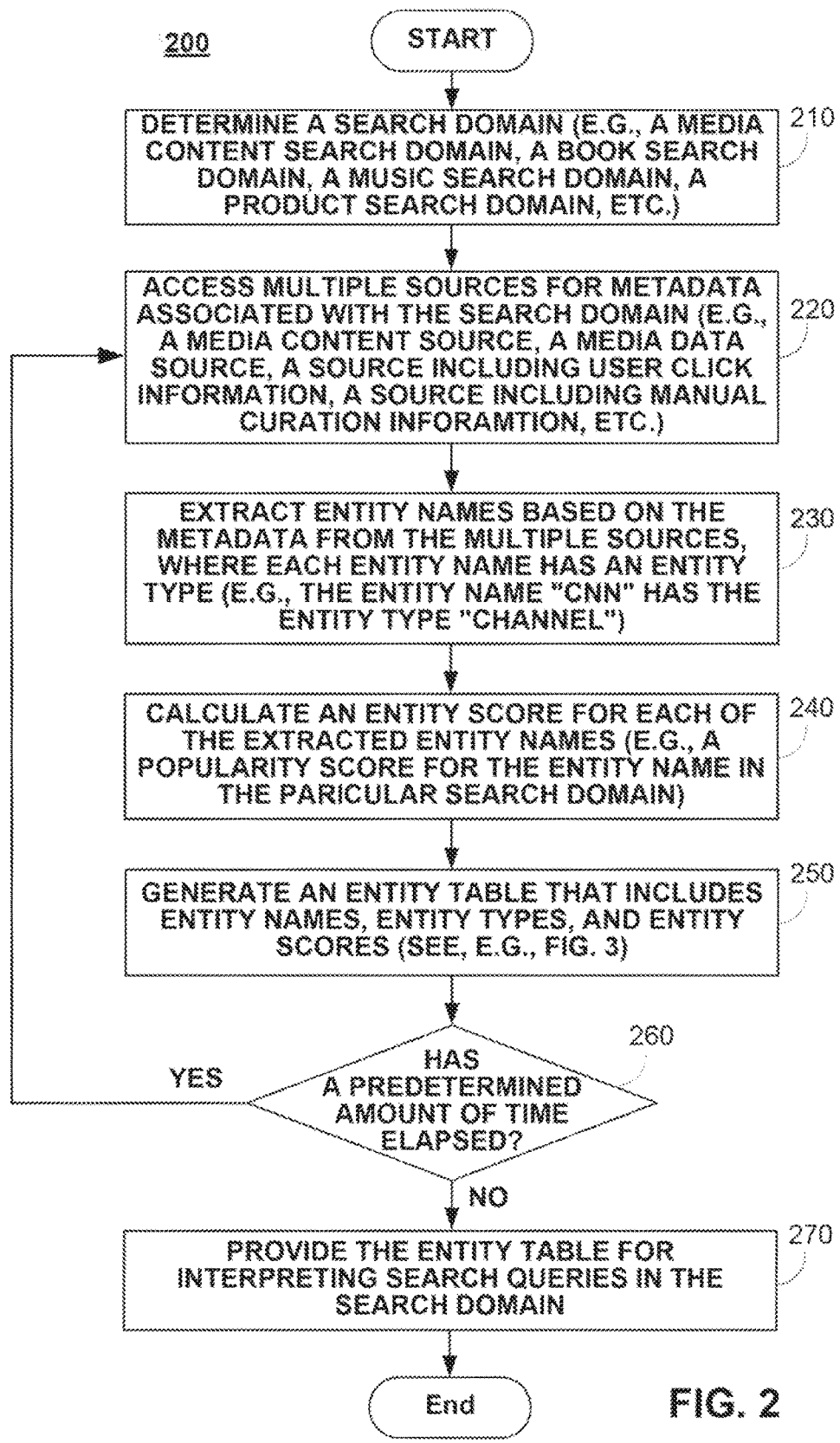
FIG. 2 is a flowchart of an illustrative process for generating entity information from metadata associated with a search domain in accordance with some implementations of the disclosed subject matter.

Turning to FIG. 2, FIG. 2 is a flow chart of an illustrative process 200 for generating entity information from metadata associated with a search domain in accordance with some implementations of the disclosed subject matter.

In some implementations, process 200 can begin by determining the search domain at 210. For example, as described above, the search domain can be a media content domain that includes television programs, movies, video clips, and other media content. The query interpretation application can determine that the search query is received from a media playback device and, in response, can restrict the search query to a media content domain. As also described above, the query interpretation application can be implemented with any suitable search domain, such as a books and literature search domain, a music search domain, a product search domain, etc.

At 220, in response to determining the search domain, the query interpretation application can access one or more suitable sources for metadata associated with the search domain. For example, in a media search domain on a media playback device, the query interpretation application can retrieve metadata associated with the media search domain from multiple sources, such as a media content source, a media data source, and/or any other suitable database containing data relating to media content available for presentation to the user. In another example, the query interpretation application can transmit a query to the database or any other suitable source for metadata associated with the media search domain.

In some implementations, the query interpretation application can provide the user with an opportunity to select from available databases or sources. For example, in a media search domain, the query interpretation application can prompt the user to select from a database associated with a content provider, an online database of information relating to movies and television programs, etc.

At 230, the query interpretation application can extract entity names based on metadata retrieved from one or more sources. For example, in a media search domain, the query interpretation application can receive metadata associated with various television programs and movies and use the received metadata to extract entity names that include television series titles, movie titles, actor names, producer names, fictional character names, genre or category information, etc. In a product search domain, the query interpretation application can extract product names, manufacturer names, prices, product categories, product ratings, and merchant names based on the metadata retrieved from one or more sources. In a music search domain, the query interpretation application can extract song titles, artist names, album titles, release years, music genres, and audio formats from the retrieved metadata. In a book search domain, the query interpretation application can extract book titles, author names, publisher names, publication dates, number of pages, book genres, and book formats from the retrieved metadata.

It should be noted that each entity name has an associated entity type, such as a television series type, a movie title type, an actor name type, a genre type, etc. For example, the entity name "house" can have an entity type corresponding to a television series title (e.g., a SERIES entity type). In another example, the entity name "house" can have multiple entity types—e.g., an entity name "house" can have a SERIES entity type indicating that it is the title of a television series and a MOVIE entity type indicating that it is also the title of a movie.

It should also be noted that each entity name can also have an associated entity score. In some implementations, the entity score can be calculated and/or assigned based on the popularity of the entity name within the search domain at 240. For example, the query interpretation application can calculate a popularity score for an entity name based on any suitable number of criteria. In a more particular example, the query interpretation application can calculate a popularity score based on user ratings for a piece of media content, based on the number of times the entity name has been searched, based on the number of times the media content associated with the entity name has been accessed, and/or any other suitable criteria.

In some implementations, the query interpretation application can calculate an entity score, where the entity score is a combination of entity scores or an aggregate entity score. For example, the entity score for the entity name "tom cruise" can be an average of the entity scores corresponding to each piece of media content associated with the entity name. In a more particular example, the query interpretation application can calculate an entity score for an entity name associated with a movie that includes the actor "tom cruise" and can propagate that score to other entity names (e.g., the entity name "tom cruise," the entity name associated with the producer of the movie, etc.). In this example, the entity score for the entity name "tom cruise" can be an average score of the propagated entity scores associated with the movies in which "tom cruise" is an actor. In another example, the entity score associated with a television channel can be an average of the propagated entity scores associated with the television programs provided by that television channel (e.g., the entity score for the entity name "Channel A" can be the average of the entity scores associated with "Program A" through "Program Z" provided by "Channel A").

Additionally or alternatively, the query interpretation application can assign any suitable weight to each of the entity scores associated with the media content. For example, the query interpretation application can assign weights to each entity score based on the release date of the media content. In this example, the entity score for recent movies that include the actor "tom cruise" can have a greater influence on the aggregate entity score than past movies that include the actor.

At 250, the query interpretation application can generate an entity table that includes the extracted entity names and the associated entity types and the entity scores. An illustrative example of an entity table that includes entity names extracted from metadata associated with a search domain and their associated entity types and calculated entity scores is shown in FIG. 3. As shown, the entity table includes the multiple entities having the same name (e.g., the entity name "HOUSE"). As also shown, each entity name has a different entity type (e.g., a MOVIE entity type, a SERIES entity type, a CHARACTER entity type, and an ACTOR entity type) and a different entity score associated with it. The entity table can, for example, define a vocabulary or a dictionary of words or phrases for the search domain such that search terms can be restricted to this vocabulary.

It should be noted that, in some implementations, additional information for the entity table can be obtained from various sources (e.g., marketplace sources, social media sources, searching sources, etc.). For example, the query interpretation application can access a click log that includes feedback information relating to users in the search domain. The click log can include an indication of the number of times users have inputted search queries that include a particular entity name. The click log can also include an indication of the number of times users have selected a particular search result for playback or accessed a particular piece of media content. In response, the query interpretation application can use information from the click log to add entity names and/or update entity scores. For example, in response to determining that a substantial number of users have queried a television program or have selected a television program that appears as a search result, the query interpretation application can increase the associated entity score (e.g., indicating greater popularity or greater relevance).

It should also be noted that, in some implementations, users may opt out of data collection in click logs. For example, the query interpretation application can access statistical information relating to entities in the given search domain (e.g., statistical information can indicate that the entity "tom cruise" is a more popular search term in the search domain than the entity "john doe"). Click log information may not be connected with user names or other personally identifying information.

In some implementations, the query interpretation application can access an additional source that includes manually curated entity information. Manually curated entity information can include, for example, common terms that can be ignored by the application when interpreting queries and/or entity information that may not be included in the metadata sources. In a more particular example, manually curated entity information can include the terms "with," "the," "a," "&," and "and." This manually curated entity information can also include an instruction that the query interpretation application may ignore these terms in search queries. In another more particular example, manually curated entity information can include an instruction that the query interpretation application may ignore particular characters, such as apostrophe marks and hyphens. In yet another more particular example, manually curated entity information can include popular or common entity names and other entity information that may not be included in the metadata sources (e.g., from a social media source).

In some implementations, the query interpretation application can update the entity table and/or any other suitable entity information. Referring back to FIG. 2, at 260, the query interpretation application can determine whether a predetermined amount of time has elapsed (e.g., twelve hours, twenty-four hours, one week, etc.). In response to determining that a predetermined amount of time has elapsed (e.g., calculating the age of the entity table), the query interpretation application can return to 220, where one or more sources are accessed for retrieving metadata. The query interpretation application can then generate an updated entity table based on the newly retrieved metadata.

Alternatively, the query interpretation application can provide the entity table for use in interpreting search queries at 270. For example, when used with a media playback device, the query interpretation application can store the entity table in the media playback device.

Figure 4:
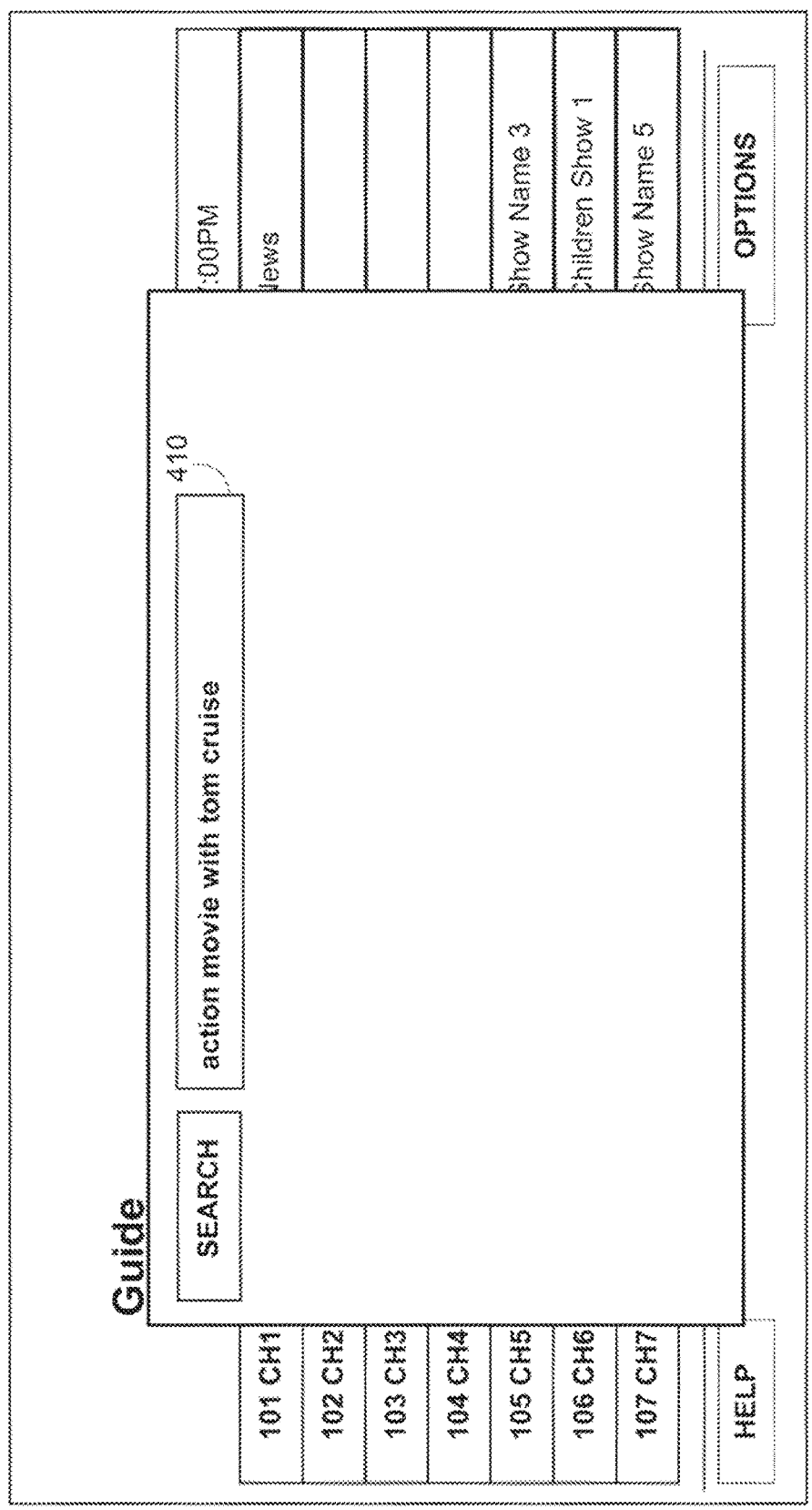
FIG. 4 is an illustrative screen of a search interface for receiving search queries in accordance with some implementations of the disclosed subject matter.

Referring back to FIG. 1, the query interpretation application can use the entity information contained in the entity table to determine whether the search terms correspond to entity names at 130 and determine the entity type and the entity score associated with the matching entity names at 140. As mentioned above and as shown in FIG. 4, the search query of "action movie with tom cruise" has been inputted by a user in a search field 410. In response, the query interpretation application can determine that the search terms "action," "movies," "tom cruise," "tom," and "the cruise" derived from the search query correspond to entity names in the entity table. An illustrative example of the entity results obtained from the entity table is shown in FIG. 5. As shown in FIG. 5, the entity name "tom cruise" has an entity type ACTOR and has an entity score of 5.750. As another example, the entity name "the cruise" has an entity type SERIES and has an entity score of 1.000, while an entity having the same entity name "the cruise" has an entity type MOVIE and has an entity score of 5.000 indicating that it is more popular than the television series.

At 150, the query interpretation application can use this entity information to interpret the search query. More particularly, the query interpretation application can interpret the entity names based on entity scores and/or contextual information.

In some implementations, the query interpretation application can remove a search term based on entity scores. For example, as shown in FIG. 5, the query interpretation application can determine whether to remove the search term "the cruise" having a SERIES entity type as the search term "the cruise" having a MOVIE entity type has a larger entity score indicating that the movie is more popular than the television series. As also shown in FIG. 5, for entities having the same entity name, the entity table can be sorted by entity score. In this example, the query interpretation application can determine whether to remove one or more search terms having lower entity scores, such as the search term "action" having a MOVIE entity type and a low entity score of 0.345.

It should be noted, however, that the query interpretation application can remove search terms based any suitable criteria. For example, in some implementations, the query interpretation application can remove a search term based on contextual information from the received search query. These are sometimes referred to herein as unlikely entities.

In some implementations, the query interpretation application can remove unlikely entities from a set of entity results by removing overlapping search terms. In the example shown in FIG. 5, although the entity table indicated that matching entities include the term "tom" and the term "tom cruise," the query interpretation application can remove the term "tom" (and its multiple entity types) as the term "tom cruise" includes the term "tom."

In some implementations, the query interpretation application can remove unlikely entities from a set of entity results based on contextual information in the received search query. Note that the query interpretation application can receive a structured search query and interpret the structured search query as a sequence of multiple search constraints. For example, the query interpretation application can interpret the term "2012" in a search query "action movie 2012" based on the other terms included in the received search query. In a more particular example, the query interpretation application can determine that the term "2012" from the search query "action movie 2012" is unlikely to be a movie title having the entity type MOVIE because of its position within the search query and because of the other terms within the search query (e.g., the term "2012" follows the terms "action" and "movie"). In addition, based on contextual information in the search query, the query interpretation application can determine that the term "2012" has a greater likelihood of having an entity type of RELEASE DATE or AIRING DATE. Accordingly, the query interpretation application can remove the entity "2012" that has the entity type corresponding to a movie title from the set of entity results. Alternatively, if the search query included the term "2012" by itself, the query interpretation application can determine that the term "2012" has a greater likelihood of being a movie title and having the entity type MOVIE.

It should be noted that any suitable approach can be used for removing unlikely entities from a set of entity results. For example, the query interpretation application can remove unlikely entities based on click log information or any other suitable user feedback information. More particularly, the query interpretation application can determine that the term "tom" is rarely searched by other users and, in response, the query interpretation application can remove the term "tom" as being an unlikely entity for performing the search command. In another example, the query interpretation application can remove unlikely entities based on additional information sources, such as social media information sources. More particularly, the query interpretation application can retrieve social media statistics relating to a social media source and determine that, although "tom" is rarely searched by other users in the media search domain, the term "tom" is gaining popularity on the social media source.

As shown in FIG. 6, upon removing unlikely entities based on entity scores and contextual information, the query interpretation application can obtain a set of interpreted entities. More particularly, FIG. 6 shows that the query interpretation application has determined that the received search query is interpreted to include the term "action" having an entity type corresponding to a genre (a GENRE entity type), "movies" having an entity type corresponding to the type of search result (a CORPUS_TYPE_MOVIE entity type), and "tom cruise" having an entity type corresponding to the name of an actor (an ACTOR entity type).

Referring back to FIG. 1, the query interpretation application can perform a search using the set of interpreted entities at 160. In connection with the above-mentioned example, the query interpretation application can use the entity types associated with each of the interpreted entities to apply an entity name into a corresponding search field. As described in the example above, the query interpretation application can apply the term "action" in a genre search field, the term "movie" as a search result type, and the term "tom cruise" in an actor or actress search field.

In some implementations, the query interpretation application can format the set of interpreted entities into a database query, such as a Structured Query Language (SQL) query. An illustrative SQL query generated by the query interpretation application that includes the set of interpreted entities can be represented as follows:

SELECT*from MOVIE where GENRE is "action" AND ACTOR is "tom cruise"

The query interpretation application can transmit the SQL query to a database and receive a response from the database.

Figure 7:
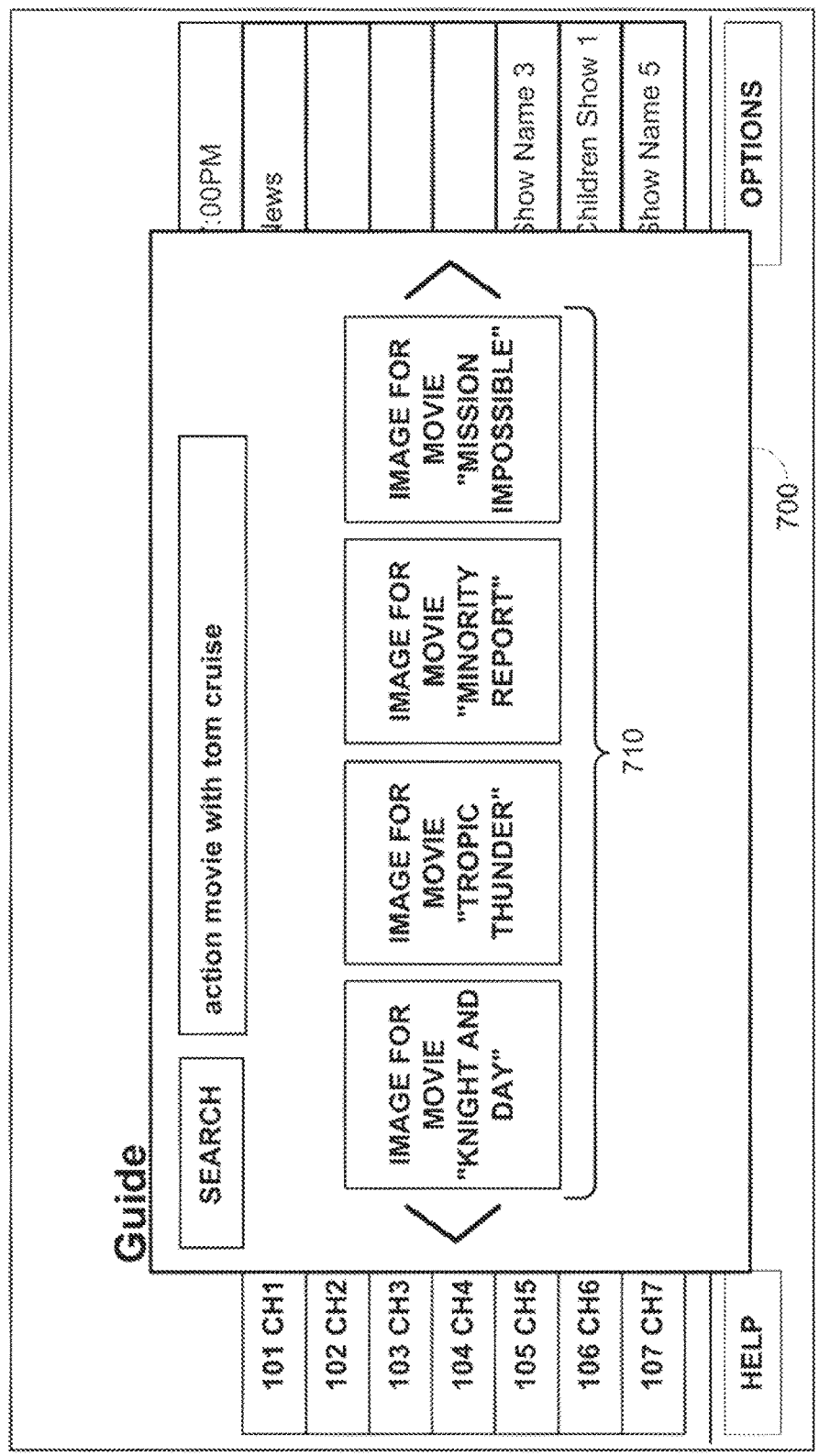
FIG. 7 is an illustrative screen of a search interface that provides search results responsive to a search query in accordance with some implementations of the disclosed subject matter.

At 170, the query interpretation application can receive the search results and cause the search results responsive to the search query to be displayed to a user. For example, as shown in FIG. 7, the query interpretation application can cause search results 710 to be displayed to a user of a media playback device. More particularly, search results 710 can be in the form of images (e.g., media cover art) relating to the search results. It should be noted that, in some implementations, any suitable information relating to the search result can be provided to the user, such as rating information, price information, format information (e.g., available for download from an over-the-top content source, available from a video-on-demand source, etc.), etc.

It should be noted that, in some implementations, the query interpretation application can be implemented on a mobile device or a tablet computing device, where a search interface for searching through media content can be presented on such a device. In this implementation, the search interface and the search results determined using the query interpretation application can be provided to the user on a second screen device, such as a mobile device or a tablet computing device, while a search result that is selected by the user on the second screen device can be retrieved and displayed on a media playback device, such as a television device.

Although the implementations described herein generally relate to receiving a search query provided by a user using a user input device (e.g., a remote control, a keyboard, a touchpad, a mobile phone, etc.), this is merely illustrative. Search queries can be received and interpreted using any suitable approach. For example, in accordance with some implementations, the query interpretation application can be used to interpret voice queries or voice commands in a particular search domain.

Figure 8:
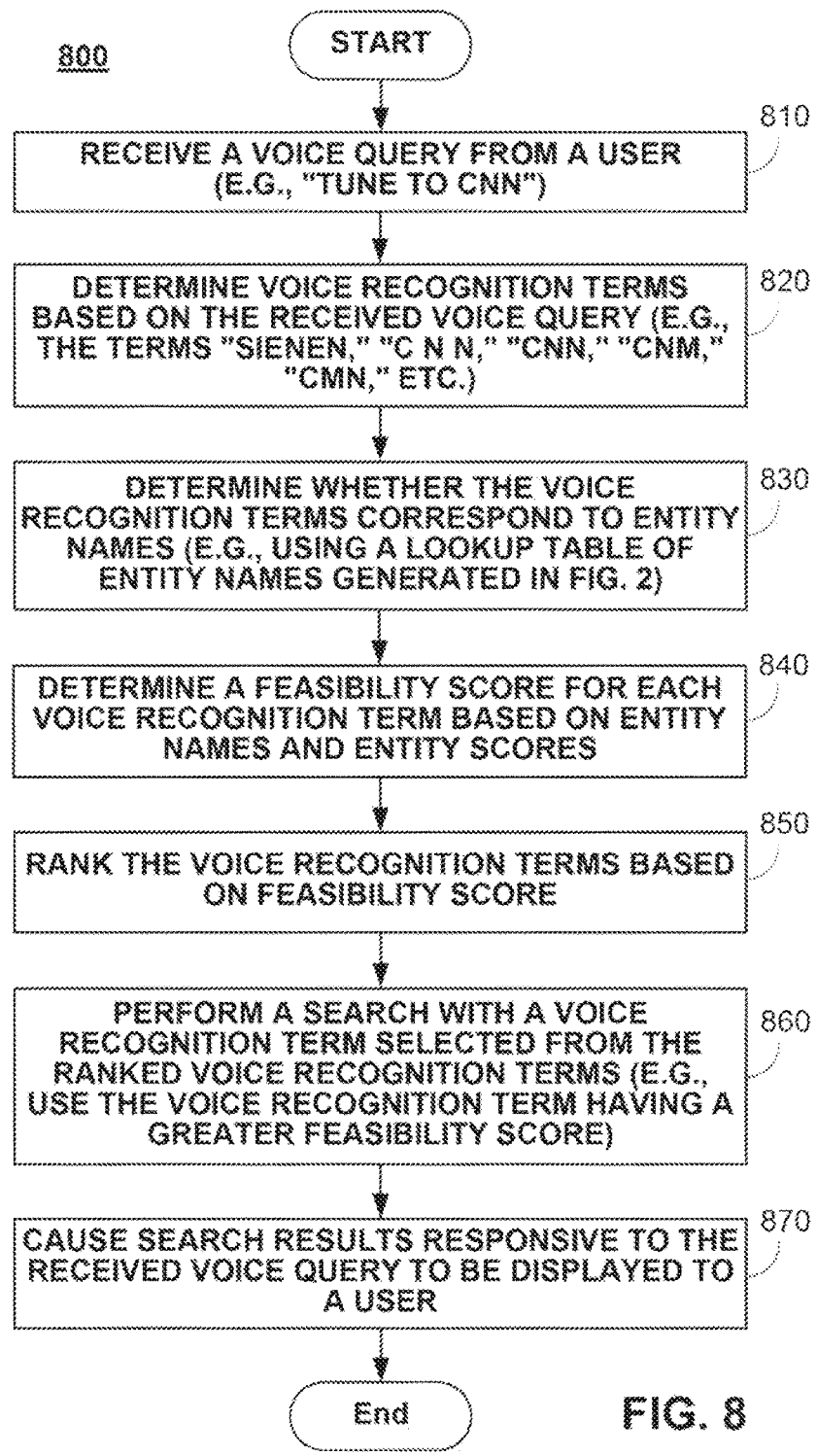
FIG. 8 is a flowchart of an illustrative process for interpreting a voice query based on entity information and feasibility scores in accordance with some implementations of the disclosed subject matter.

FIG. 8 is a flowchart of an illustrative process for interpreting a voice query based on entity information and feasibility scores in accordance with some implementations of the disclosed subject matter. As shown, process 800 can begin by receiving a voice query from a user at 810. For example, the query interpretation application can receive the voice query "tune to CNN" from a user using a media playback device having audio input capabilities (e.g., a microphone). In another example, a microphone or any other suitable audio input device on a mobile device can be used receive the voice query from the user and the mobile device can transmit the voice query to a media playback device that is executing the query interpretation application.

At 820, the query interpretation application can determine voice recognition terms based on the received voice query.

In some implementations, the query interpretation application can determine that the first portion of the received voice query (e.g., "tune") is likely to correspond to an action command term. For example, the query interpretation application can generate a set of terms from the first portion of the received voice query (e.g., "two," "tune," "tune in," "turn," etc.) and compare the set of terms with entities in an entity table having the entity type associated with action commands (e.g., an ACTION entity type). In another example, the entity table can be supplemented with manually curated entity information that includes particular entities having the entity type associated with an action command, such as "watch" (for accessing media content), "tune" (for tuning to a channel), "go to" (for accessing a website), and "launch" (for initiating an application). Using the entity table and entity scores within the entity table, the query interpretation application can determine which action command term is likely to have been provided in the voice query.

Additionally or alternatively, the query interpretation application can have a default action command in response to receiving a voice query. For example, the query interpretation application can parse the first portion of the received voice query and determine that the portion of the voice query does not correspond to an action command. In response to receiving the voice query "Channel A," the query interpretation application can, without receiving additional input from the user, associated the voice query with a predetermined action command to tune to "Channel A." The default action command can be based, for example, on the search domain (e.g., a media content search domain, where the user is using a media playback device).

In some implementations, the query interpretation application can assign default action commands based on the other terms in the voice query. For example, in response to determining that the voice query "CNN" relates to a channel identifier, the query interpretation application can use the entity type to provide a default action command to tune to the channel associated with the channel identifier. In another example, in response to determining that the voice query "CNN" relates to a website, the query interpretation application can use the entity type (e.g., a WEB_SITE entity type) to provide a default action command to launch a web browsing application and access a website corresponding to the voice query "CNN." In yet another example, in response to determining that the voice query "CNN" relates to both a channel and a website, the query interpretation application can determine the default action command based on entity score (e.g., the entity score for the channel "CNN" is greater than the entity score for the website "CNN" and, thus, the default action command is to tune to the channel associated with "CNN").

Referring back to FIG. 8, in some implementations, the query interpretation application can determine voice recognition terms based on the received voice query. For the remainder of the received voice query ("CNN"), the query interpretation application can generate one or more of the following voice recognition terms: "seaman," "sienen," "shannon," "c n n," "cnn," "cnm," and/or "cmn." At 830, the query interpretation application can determine whether the voice recognition terms correspond to entity information. For example, the query interpretation application can access an entity table similar to the one shown in FIG. 3 and determine whether the terms "sienen," "shannon," "c n n," "cnn," "cnm," and/or "cmn" match an entity name located in the entity table (e.g., the entity table of FIG. 3).

Alternatively, instead of determining that the first portion of the received voice query corresponds to an action command and generating voice recognition terms for the remainder of the voice query, the query interpretation application can segment the entire voice query to generate voice recognition terms, such as "tune," "tune to sienen," "tune to cnn," "to cnn," "turn to," etc. Similar to the search terms in FIG. 1, the query interpretation application can determine whether one or more of the generated voice recognition terms correspond to entity names in an entity table.

Figure 9:
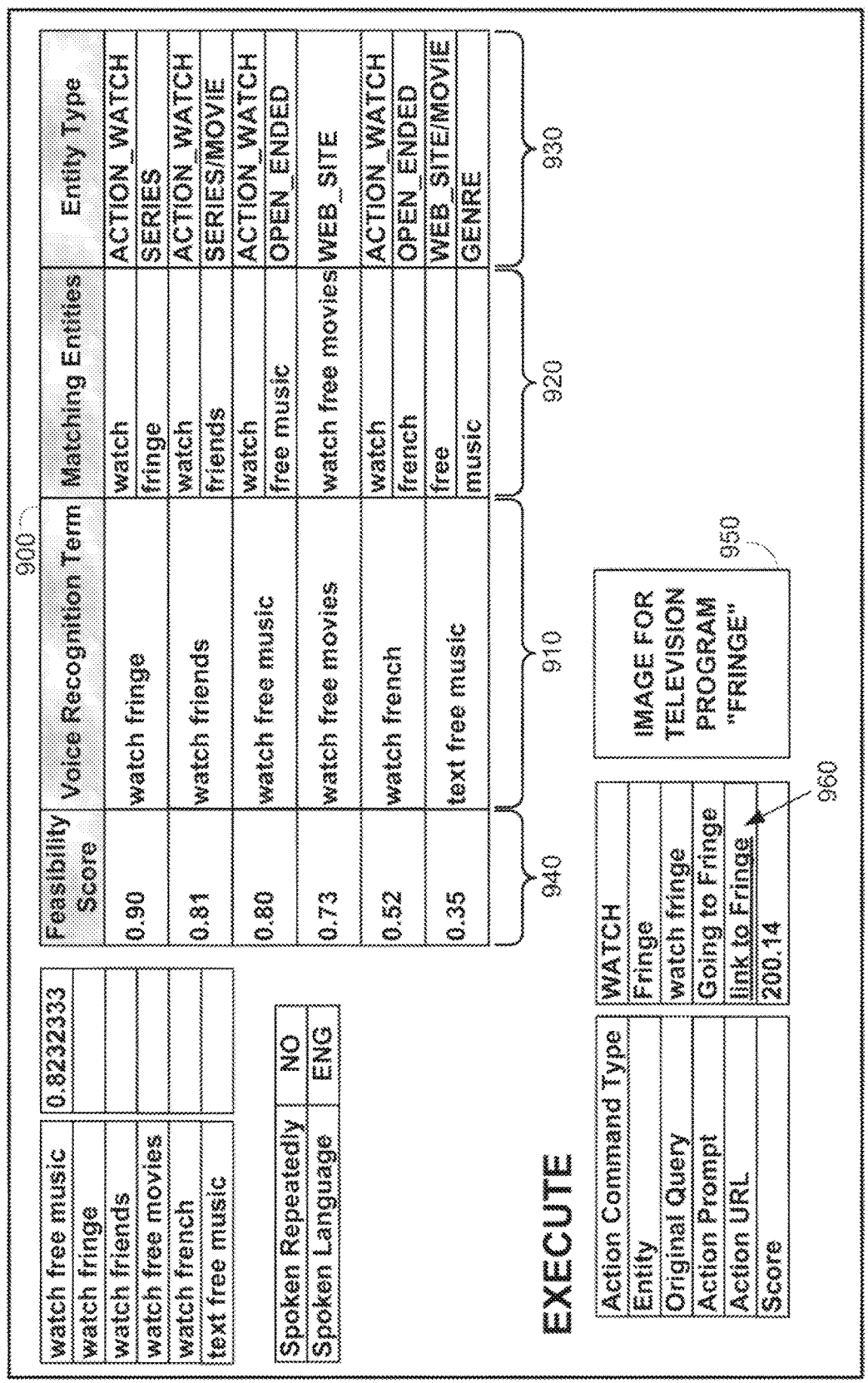
FIG. 9 is an illustrative example of an interpreted voice query including voice recognition terms based on the received voice query, matching entities, and feasibility scores in accordance with some implementations of the disclosed subject matter.

FIG. 9 shows an illustrative example of various voice recognition terms generated from a voice query and the selected voice recognition term for execution in accordance with some implementations of the disclosed subject matter. As shown, in response to the voice query "watch fringe," the query interpretation application has determined that the voice query can include the voice recognition terms "watch free music," "watch fringe," "watch friends," "watch free movies," "watch french," and "text free music." Using the entity table and/or other entity information, FIG. 9 also shows that the query interpretation application has determined entities corresponding with the voice recognition terms. For example, the query interpretation application has determined that the voice recognition term "watch fringe" (shown in column 910) has the matching entities "watch" (with an ACTION_WATCH entity type) and "fringe" (with a SERIES entity type) (shown in columns 920 and 930). In another example, the query interpretation application has determined that the entire voice recognition term "watch free movies" matches the entity "watch free movies," which corresponds to a particular website for playing back movie content.

Referring back to FIG. 8, the query interpretation application can determine a feasibility score for each of the voice recognition terms at 840. Using the entity table described above, the feasibility score for a voice recognition term can be based on the matching entity names and their associated entity scores. For example, if the voice recognition terms include the terms "house" and "horse" and it is determined that "house" has a higher entity score (e.g., is more popular) than "horse," the query interpretation application can calculate a feasibility score that is based on the entity score. As such, the term "house" can receive a higher feasibility score than "horse" because of the higher entity score. This can reflect that the term "house" (having an entity type that corresponds to a television series) is more likely to be queried by users than the less popular "horse" (having an entity type that corresponds to a television channel).

It should be noted, however, that any suitable rules can be provided for determining the feasibility score. For example, in some implementations, the query interpretation application can provide penalty scores or penalty weights that modify the feasibility score. In a more particular example, the query interpretation application can provide a penalty score when terms within the voice recognition term are not recognized as entities in the entity table. If the terms within the voice recognition term are recognized as entities, the query interpretation application can assign a low penalty score or not assign a penalty weight (e.g., a 1.0 multiplier). If half of the terms within the voice recognition term are recognized as entities, the query interpretation application can assign a penalty score or penalty weight, such as a 0.5 multiplier. If none of the terms within the voice recognition term are recognized as entities within the entity table, the query interpretation application can assign a high penalty score or penalty weight (e.g., a 0.0 multiplier). As such, the voice recognition terms having higher entity scores and having the greater number of matching entities can receive a higher feasibility score.

In some implementations, the feasibility score can be a weighted average score of the identified entities within the voice recognition term. For example, in response to receiving a voice query that includes three entities (e.g., entity name A, entity name B, and entity name C), the feasibility score can be calculated based on the average of the entity scores for each of the identified entities. Again, to the extent there are unrecognized terms within the voice recognition term, a suitable penalty score or penalty weight can be applied to the feasibility score.

Referring back to FIG. 8, in response to determining the feasibility scores for each of the voice recognition terms, the voice recognition terms can be ranked based on the determined feasibility scores at 850. For example, as shown in FIG. 9, results table 900 includes the feasibility scores in column 940 and the query interpretation application has ranked the voice recognition terms from highest feasibility score to lowest feasibility score. As also shown in FIG. 9, the voice recognition term with the highest feasibility score is "watch fringe."

At 860, the query interpretation application can perform a search with a voice recognition term selected based on the voice recognition terms ranked by feasibility score. For example, as shown in FIG. 9, the query interpretation application can select the voice recognition term having the highest feasibility score (e.g., "watch fringe"). In another example, the query interpretation application can select the voice recognition term based on multiple criteria—e.g., a high feasibility score and a high score from a click log.

The query interpretation application can then cause the search results responsive to the received voice query to be displayed to the user at 870. For example, as shown in FIG. 9, in response to conducting an action in the media playback device for the voice recognition term "watch fringe," the query interpretation application provides an image 950, a link 960, and/or other suitable information responsive to the voice query. In another example, the query interpretation application can execute the action command based on the selected voice recognition term on the computing device associated with the user that provided the voice query.

In some implementations, the query interpretation application can allow the user to select a language for receiving voice queries. For example, as shown in FIG. 9, the query interpretation application is configured to receive voice queries in English. In another example, the query interpretation application can automatically detect the language for receiving and interpreting voice queries based on the received voice query.

Figure 10:
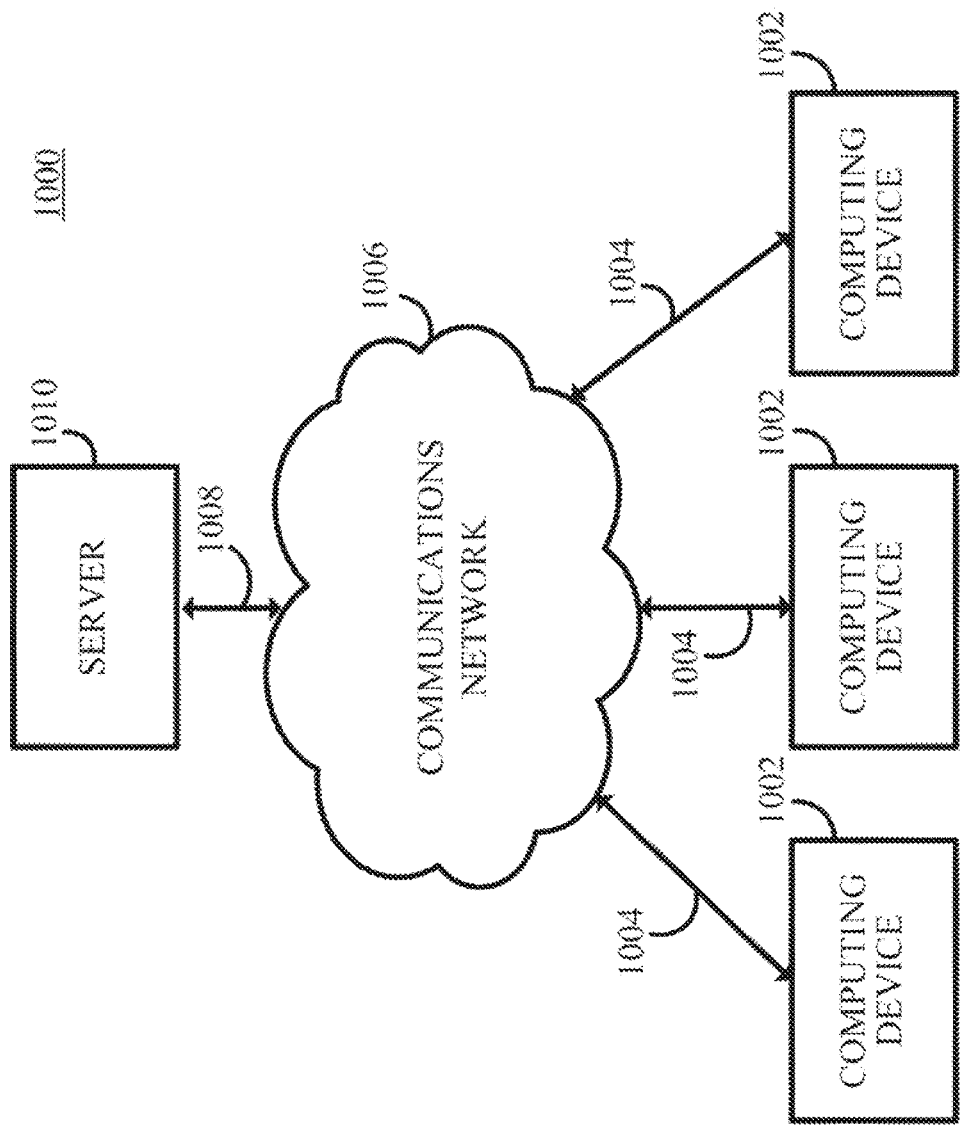
FIG. 10 is a diagram of an illustrative system suitable implementation of the query interpretation application in accordance with some implementations of the disclosed subject matter.

FIG. 10 is a generalized schematic diagram of a system on which the query interpretation application can be implemented in accordance with some implementations of the disclosed subject matter. As illustrated, system 1000 can include one or more computing devices 1002, such as a user computing device for providing search queries and/or obtaining and playing back media content items from various sources, a tablet computing device for transmitting user instructions to a television device, etc. For example, computing device 1002 can be implemented as a personal computer, a tablet computing device, a personal digital assistant (PDA), a portable email device, a multimedia terminal, a mobile telephone, a gaming device, a set-top box, a television, a smart television, etc.

In some implementations, computing device 1002 can include a storage device, such as a hard drive, a digital video recorder, a solid state storage device, a gaming console, a removable storage device, or any other suitable device for storing media content, entity tables, entity information, metadata relating to a particular search domain, etc.

In some implementations, computing device 1002 can include a second screen device. For example, the second screen device can display a search interface for receiving search queries and, in response to receiving search results responsive to a search query, can transmit playback instructions for user-selected media content to a television device. In another example, a second screen device can present the user with search and/or query interpretation preferences, where the preferences are transmitted to a set-top box or a television device.

Computing devices 1002 can be local to each other or remote from each other. For example, when one computing device 1002 is a television and another computing device 1002 is a second screen device (e.g., a tablet computing device, a mobile telephone, etc.), the computing devices 1002 may be located in the same room. Computing devices 1002 are connected by one or more communications links 1004 to a communications network 1006 that is linked via a communications link 1008 to a server 1010.

System 1000 can include one or more servers 1010. Server 1010 can be any suitable server for providing access to the query interpretation application, such as a processor, a computer, a data processing device, or a combination of such devices. For example, the query interpretation application can be distributed into multiple backend components and multiple frontend components or interfaces. In a more particular example, backend components, such as data distribution can be performed on one or more servers 1010. Similarly, the graphical user interfaces displayed by the query interpretation application, such as a search interface for retrieving media content or an interface for providing preferences relating to entity-based query interpretation, can be distributed by one or more servers 1010 to computing device 1002.

In some implementations, server 1010 can include any suitable server for accessing metadata relating to a search domain, click logs, manually curated entity information, marketplace information, social media information relating to entities, etc.

More particularly, for example, each of the computing devices 1002 and server 1010 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 1002 can be implemented as a personal computer, a tablet computing device, a personal digital assistant (PDA), a portable email device, a multimedia terminal, a mobile telephone, a gaming device, a set-top box, a television, etc.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 10, communications network 1006 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1004 and 1008 may be any communications links suitable for communicating data between computing devices 1002 and server 1010, such as network links, dial-up links, wireless links, hard-wired links, any other suitable communications links, or a combination of such links. Computing devices 1002 enable a user to access features of the application. Computing devices 1002 and server 1010 may be located at any suitable location. In one implementation, computing devices 1002 and server 1010 may be located within an organization. Alternatively, computing devices 1002 and server 1010 may be distributed between multiple organizations.

Figure 11:
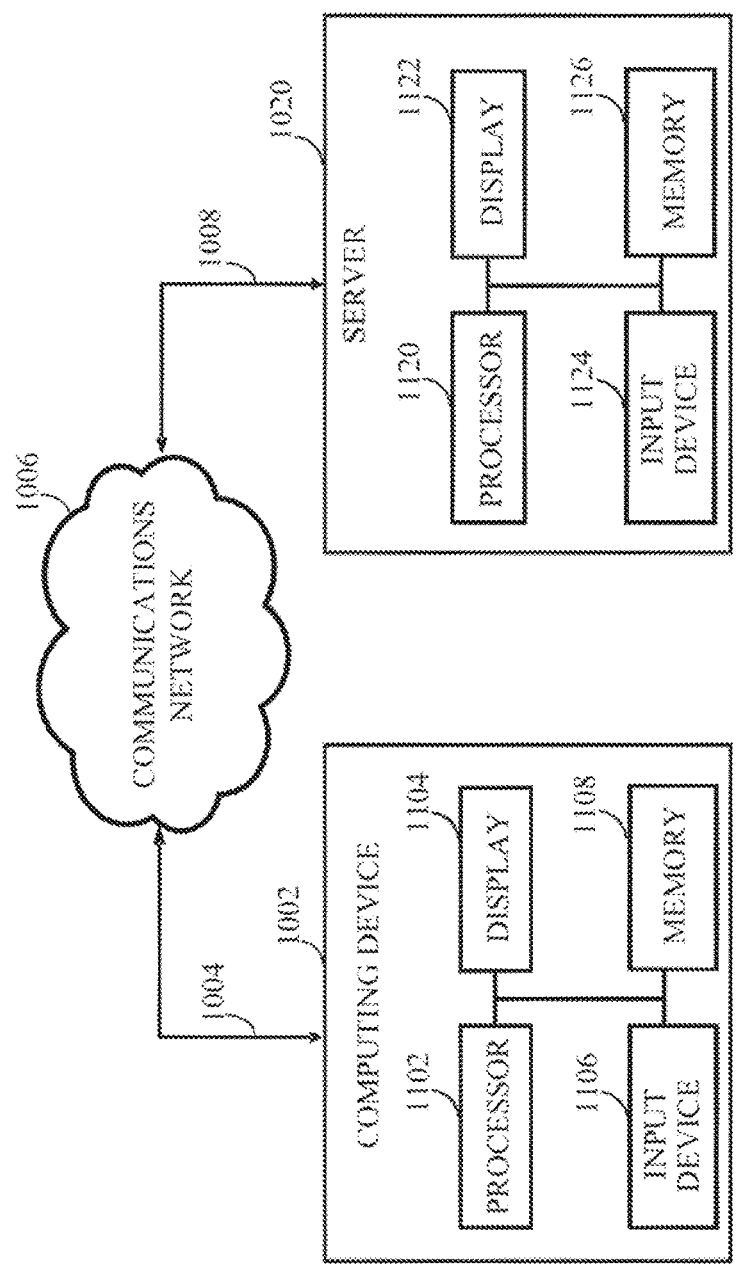
FIG. 11 is a diagram of an illustrative computing device and server as provided, for example, in FIG. 10 in accordance with some implementations of the disclosed subject matter.

Referring back to FIG. 10, the server and one of the computing devices depicted in FIG. 10 are illustrated in more detail in FIG. 11. Referring to FIG. 11, computing device 1002 may include processor 1102, display 1104, input device 1106, and memory 1108, which may be interconnected. In a preferred implementation, memory 1108 contains a storage device for storing a computer program for controlling processor 1102.

Processor 1102 uses the computer program to present on display 1104 the query interpretation application and the data received through communications link 1004 and commands and values transmitted by a user of computing device 1002. It should also be noted that data received through communications link 1004 or any other communications links may be received from any suitable source. Input device 1106 may be a computer keyboard, a mouse, a keypad, a cursor-controller, dial, switchbank, lever, a remote control, or any other suitable input device as would be used by a designer of input systems or process control systems. Alternatively, input device 1206 may be a finger or stylus used on a touch screen display 1204. For receiving the voice queries described above, input device 1206 may be a microphone.

Server 1010 may include processor 1120, display 1122, input device 1124, and memory 1126, which may be interconnected. In a preferred implementation, memory 1126 contains a storage device for storing data received through communications link 1008 or through other links, and also receives commands and values transmitted by one or more users. The storage device further contains a server program for controlling processor 1120.

In some implementations, the application may include an application program interface (not shown), or alternatively, the application may be resident in the memory of computing device 1002 or server 1010. In another suitable implementation, the only distribution to computing device 1002 may be a graphical user interface ("GUI") which allows a user to interact with the application resident at, for example, server 1010.

In one particular implementation, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

Accordingly, methods, systems, and media for interpreting queries are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter. Features of the disclosed implementations can be combined and rearranged in various ways.

What is claimed is:

1. A method comprising:
   determining, based on a voice query received in a search domain, a first voice recognition term and a second voice recognition term;
   determining that at least a portion of the first voice recognition term corresponds to an entity name associated with the search domain;
   determining, based on the entity name, a feasibility score for the first voice recognition term;
   ranking, based on the feasibility score, the first voice recognition term relative to the second voice recognition term; and
   based on a determination that a first portion of the voice query does not correspond to an action command term, executing the voice query in the search domain in accordance with a default action command and using the first voice recognition term, the first voice recognition term being selected for use over the second voice recognition term based on the ranking.

2. The method of claim 1, wherein the determining the first voice recognition term and the second voice recognition term includes segmenting the voice query to generate:
   the first voice recognition term as the first portion of the voice query; and
   the second voice recognition term as a second portion of the voice query.

3. The method of claim 1, wherein:
   the determining the first voice recognition term and the second voice recognition term includes segmenting an entirety of the voice query to generate the first voice recognition term; and
   the determining that at least the portion of the first voice recognition term corresponds to the entity name includes determining that the entirety of the voice query corresponds to the entity name.

4. The method of claim 1, further comprising:
   determining, based on an additional voice query received in the search domain, a third voice recognition term and a fourth voice recognition term, the determining the third voice recognition term and the fourth voice recognition term includes:
      determining that a first portion of the additional voice query corresponds to an additional action command term, and
      generating a set of terms, including the third voice recognition term and the fourth voice recognition term, based on the first portion of the additional voice query; and
   determining that at least a portion of the third voice recognition term corresponds to an additional entity name associated with the search domain by comparing the set of terms with entities in an entity table associated with action command terms.

5. The method of claim 4, the entity table includes curated entity information for a plurality of action command terms.

6. The method of claim 1, wherein the default action command is based on the search domain.

7. The method of claim 1, wherein:
   the entity name to which at least the portion of the first voice recognition term corresponds is of an entity type; and
   the default action command is based on the entity type.

8. The method of claim 1, wherein:
   the entity name to which at least the portion of the first voice recognition term corresponds is of a first entity type;
   the method further comprises determining that at least a portion of the second voice recognition term corresponds to an additional entity name of a second entity type different from the first entity type; and
   the default action command is determined based on:
      a first entity score for the entity name,
      a second entity score for the additional entity name, and
      at least one of the first entity type or the second entity type.

9. The method of claim 1, wherein the determining the feasibility score for the first voice recognition term includes applying a penalty score to the feasibility score, the penalty score based on how many terms associated with the first voice recognition term are recognized as entities in an entity table.

10. The method of claim 1, wherein the determining the feasibility score for the first voice recognition term includes weighting an average entity score for a plurality of terms that are associated with the first voice recognition term and recognized as entities in an entity table.

11. The method of claim 1, wherein the voice query is received from at least one of:
   a media playback device having audio input capabilities; or
   an audio input device included within a mobile device.

12. The method of claim 1, further comprising detecting a language in which the voice query is spoken;
   wherein the determining the first voice recognition term and the second voice recognition term includes interpreting the voice query based on the detected language.

13. A system comprising:
   a memory storing instructions; and
   a processor communicatively coupled to the memory and configured to execute the instructions to perform a process comprising:
      determining, based on a voice query received in a search domain, a first voice recognition term and a second voice recognition term;
      determining that at least a portion of the first voice recognition term corresponds to an entity name associated with the search domain;
      determining, based on the entity name, a feasibility score for the first voice recognition term;
      ranking, based on the feasibility score, the first voice recognition term relative to the second voice recognition term; and
      based on a determination that a first portion of the voice query does not correspond to an action command term, executing the voice query in the search domain in accordance with a default action command and using the first voice recognition term, the first voice recognition term being selected for use over the second voice recognition term based on the ranking.

14. The system of claim 13, wherein the determining the first voice recognition term and the second voice recognition term includes segmenting the voice query to generate:
   the first voice recognition term as the first portion of the voice query; and
   the second voice recognition term as a second portion of the voice query.

15. The system of claim 13, wherein the process further comprises:

determining, based on an additional voice query received in the search domain, a third voice recognition term and a fourth voice recognition term, the determining the third voice recognition term and the fourth voice recognition term includes:
- determining that a first portion of the additional voice query corresponds to an additional action command term, and
- generating a set of terms, including the third voice recognition term and the fourth voice recognition term, based on the first portion of the additional voice query; and determining that at least a portion of the third voice recognition term corresponds to an additional entity name associated with the search domain by comparing the set of terms with entities in an entity table associated with action command terms.

16. The system of claim 13, wherein the default action command is based on the search domain.

17. The system of claim 13, wherein:
- the entity name to which at least the portion of the first voice recognition term corresponds is of an entity type; and
- the default action command is based on the entity type.

18. The system of claim 13, wherein:
- the entity name to which at least the portion of the first voice recognition term corresponds is of a first entity type;
- the process further comprises determining that at least a portion of the second voice recognition term corresponds to an additional entity name of a second entity type different from the first entity type; and
- the default action command is determined based on:
  - a first entity score for the entity name,
  - a second entity score for the additional entity name, and
  - at least one of the first entity type or the second entity type.

19. A non-transitory computer-readable medium storing instructions that, when executed, cause a processor of a computing device to perform a process comprising:
- determining, based on a voice query received in a search domain, a first voice recognition term and a second voice recognition term;
- determining that at least a portion of the first voice recognition term corresponds to an entity name associated with the search domain;
- determining, based on the entity name, a feasibility score for the first voice recognition term;
- ranking, based on the feasibility score, the first voice recognition term relative to the second voice recognition term; and
- based on a determination that a first portion of the voice query does not correspond to an action command term, executing the voice query in the search domain in accordance with a default action command and using the first voice recognition term, the first voice recognition term being selected for use over the second voice recognition term based on the ranking.

20. The non-transitory computer-readable medium of claim 19, wherein the determining the first voice recognition term and the second voice recognition term includes segmenting the voice query to generate:
- the first voice recognition term as the first portion of the voice query; and
- the second voice recognition term as a second portion of the voice query.

* * * * *